United States Patent [19]

Fowles et al.

[11] 4,174,238

[45] Nov. 13, 1979

[54] HERMETICALLY SEALED TAMPERPROOF PORT PROTECTOR AND METHOD OF MAKING FRANGIBLE SEAL

[75] Inventors: Thomas A. Fowles, McHenry, Ill.; David A. Winchell, Twin Lakes, Wis.

[73] Assignee: Baxter Travenol Laboratories, Inc., Deerfield, Ill.

[21] Appl. No.: 872,287

[22] Filed: Jan. 25, 1978

Related U.S. Application Data

[62] Division of Ser. No. 777,753, Mar. 14, 1977, Pat. No. 4,127,208.

[51] Int. Cl.$^2$ ............................................. B29C 27/00
[52] U.S. Cl. ............................ 156/69; 128/214 R; 156/221; 156/292; 156/306; 206/631; 206/634; 206/828; 215/1 C; 215/232; 215/253; 215/DIG. 3; 264/248; 403/2; 428/43
[58] Field of Search ................ 156/221, 282, 69, 306; 428/43; 264/248; 403/2, 270; 53/39; 128/214 R; 206/438, 634, 631, 828; 215/1 C, 253, 232, DIG. 3, 251; 220/266

[56] References Cited

U.S. PATENT DOCUMENTS

| | | | |
|---|---|---|---|
| 3,743,562 | 7/1973 | Phipps | 156/64 |
| 3,923,182 | 12/1975 | Choksi | 215/1 C |
| 3,945,525 | 3/1976 | Jones | 215/253 |

Primary Examiner—John T. Goolkasian
Assistant Examiner—J. J. Gallagher
Attorney, Agent, or Firm—Paul C. Flattery; John P. Kirby, Jr.; George Gerstman

[57] ABSTRACT

A thermoplastic pharmaceutical solution container includes a neck portion having at least one port through the neck portion. A thermoplastic port protector or closure covers the port and defines a frangible section. The closure has a length to diameter ratio providing good mechanical advantage leverage to rupture the frangible section when the closure is pushed sideways. A seal is formed with the closure by forcing a die heated above the melting point of the plastic material into the neck portion, removing a portion of the port protector and forming a depression. The frangible section is formed in the vertical side wall of the depression.

3 Claims, 11 Drawing Figures

HERMETICALLY SEALED TAMPERPROOF PORT PROTECTOR AND METHOD OF MAKING FRANGIBLE SEAL

This is a division of application Ser. No. 777,753, filed Mar. 14, 1977, now U.S. Pat. No. 4,127,208.

BACKGROUND OF THE INVENTION

Sterile pharmaceutical solutions, such as 5 percent dextrose, normal saline and the like, are supplied to hospitals for infusion into a patient's veins from a container hanging above the patient. The sterile liquid flows by gravity through a tubular administration set connected at one end to the container and at an opposite end to a venous needle in the patient.

Such containers are frequently formed of thermoplastic material, and will include a neck portion having one or more ports or openings extending through the neck portion. Such ports may be commonly hermetically sealed to provide sterile sealed contents to the container.

It is desirable that the port be in a sterile environment. Difficulty is experienced with thermoplastic closures bonded directly to the bottle neck in that excessive force is required to fracture or remove the closure. Frangible thermoplastic closures are known wherein a frangible section is provided around its base defined by a series of slots or cuts in the closure; such closure does not maintain the sterile environment within the closure. An example of this type of closure is shown in McPhee U.S. Pat. No. 3,904,060. Thermoplastic closures are also known which are bonded entirely around their base to provide a hermetic seal; a frangible section may be provided adjacent the seal. The frangible sections commonly require flexural shear force to fracture and the required force frequently is too great for many applications. An example of a closure requiring a separate threaded screw-jack ring to attain flexural shear force to fracture the frangible section is shown in Choksi U.S. Pat. No. 3,923,182.

SUMMARY OF THE INVENTION

The present invention is directed to an improved pharmaceutical container of the type having a neck portion with at least one port or opening extending through the neck portion. The port or opening may be hermetically sealed. In accordance with the present invention, there is provided a cup-shaped thermoplastic port protector or protective closure covering the port. The port protector is bonded to the neck portion and defines a frangible section at the bond.

As used in the specification and claims herein, the term "neck portion" includes the generally vertically oriented neck of the container and any generally horizontally oriented platform or base extending from the neck or depending from the neck.

In one embodiment, a flange originally carried by the closure is engaged by a heat and pressure die to remove the flange from the closure and to form a depression, with the flange material being forced into an annular bead. A frangible web or section is formed normal to the depression, and the frangible section will be fractured by tensile load. The port protector forms a sterile hermetically sealed closure over the port capable of withstanding normal pressure differential stresses.

To facilitate rupturing of the frangible section when the port protector is pushed sideways, the port protector has a length to diameter ratio providing good mechanical advantage leverage. A length at least equal to the diameter of the port protector has been found satisfactory.

Advantageously the closure is hermetically bonded and sealed completely around the container which insures sterility. The closure is tamperproof; the bond must be broken to open the closure which reveals tampering. In one embodiment, the closure material is made of the same type of material as the neck of the container so that compatibility difficulties do not arise. The closure is nonreuseable; once the closure is removed, it cannot be reapplied to the container. Moreover, the closure is inexpensive.

Additionally, the closure can be used on multiple port containers; one molded closure may be bonded to yield multiple closed chambers which cover different ports.

The closure may also be advantageously placed over a port tube projecting from the neck of the container. The closure is spaced apart over the port tube so that sufficient clearance exists when bending the closure sideways to rupture the frangible section without the port tube interfering with the closure. The closure is also adapted for closing or covering the opening in the neck of a container.

The closure may also be placed over a cannula or spike to protect it from contamination. Thus in one embodiment of the invention, the container is a hypodermic syringe with the closure being used to cover the needle.

A more detailed explanation of the invention is provided in the following description and claims, and is illustrated in the accompanying drawings.

DETAILED DESCRIPTION OF THE ILLUSTRATIVE EMBODIMENT

Figure 1:
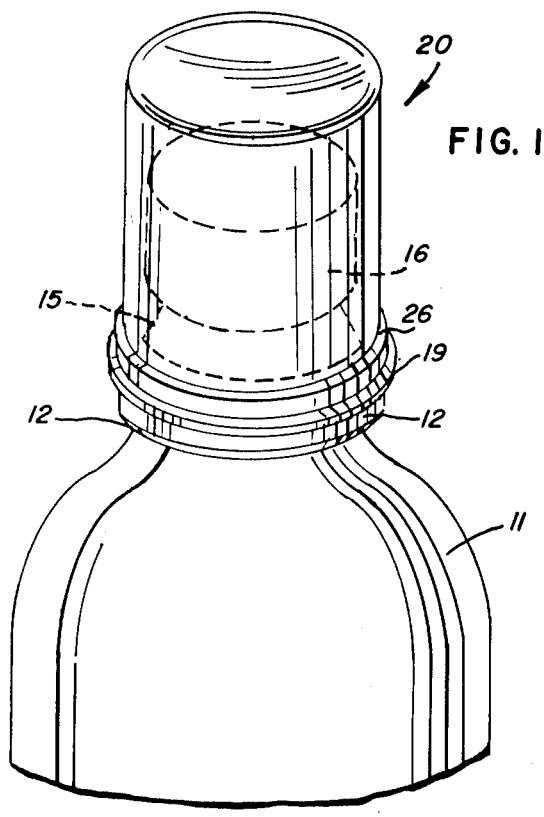
FIG. 1 is a fragmentary perspective view of a container having a protective closure according to the present invention.

Referring now to the embodiment of FIGS. 1 through 5, there is fragmentarily illustrated a thermoplastic container 10 having a body 11 and an integral neck portion 12. The neck portion 12 is formed integrally with body 11 of the container 10 in a conventional manner. In the illustrative embodiment, a port 15, here illustrated as a port tube formed integrally with and projecting from the neck portion 12, is provided. The port tube 15 is hermetically sealed as by a threaded closure cap 16.

Figure 5:
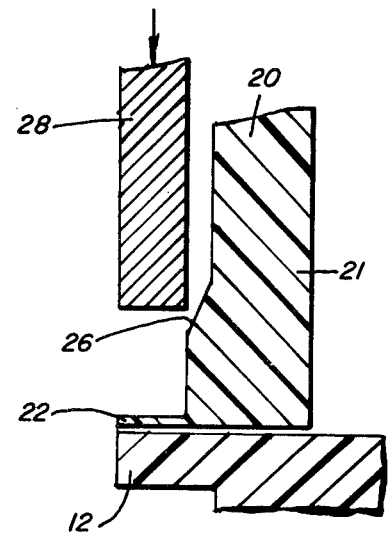
FIG. 5 fragmentarily illustrates an assembly step in the manufacture and assembly of the container of FIG. 1.
Figure 2:
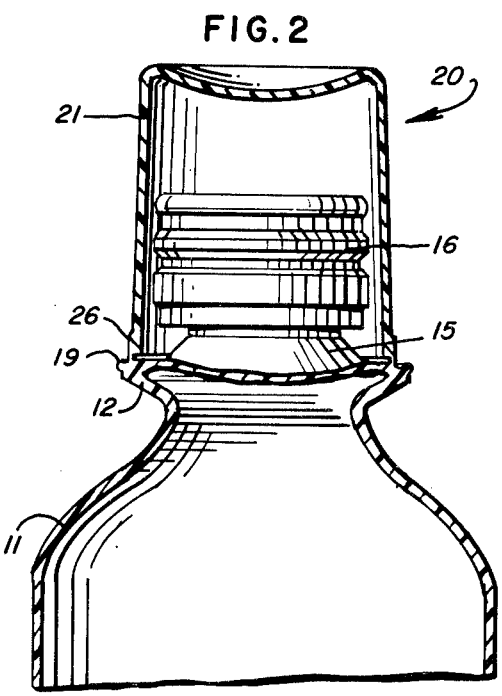
FIG. 2 is an elevational cross-sectional view of the container in FIG. 1.
Figure 6:
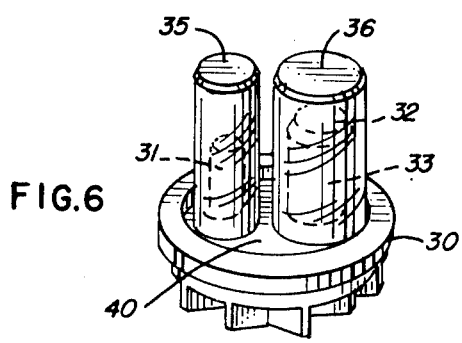
FIG. 6 is a fragmentary perspective view of a container closure having multiple ports and protective closures according to the present invention.
Figure 3:
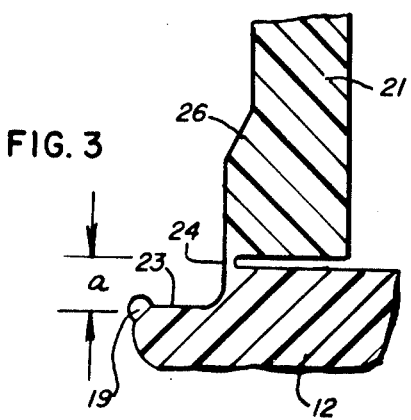
FIG. 3 is an enlarged fragmentary view of the frangible sealed section of the closure and container prior to rupture.

In accordance with the present invention a thermoplastic protective closure or protector 20 covers cap 16 to provide a hermetically sealed sterile environment. The closure 20 is generally cup-shaped having a closure cap or body portion 21 and originally has an integral thin radially outwardly extending base or flange 22 (FIG. 5). In a preferred embodiment, a chamfer 26 is defined between the flange 22 and body portion 21. The flange 22 is removed from the body portion during heat sealing and is stored into an annular bead 19 as a result of downward heat and pressure. The downward heat and pressure also forms a depression 23 (FIG. 3) around the top surface of neck 12. A frangible web or section 24 is thus formed normal to the depression 23 with frangible section 24 forming the vertical side wall of depression 23. A chamfer 26 is provided adjacent frangible section 24.

Figure 4:
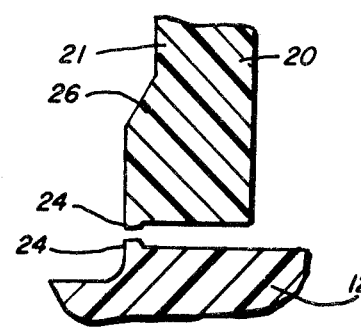
FIG. 4 is an enlarged fragmentary view of the frangible sealed section of FIG. 3 after rupture and drawn to a larger scale.

Advantageously the frangible section 24 will rupture under tensile load to provide a horizontal break as shown in FIG. 4. The tensile stress of one suitable polyolefin, e.g., polypropylene, is in the range of 4300 and 5500 psi, compared with its flexural yield strength of 6000 to 8000 psi. The seal will therefore rupture under less load than prior commercial seals to make removal of the closure easier. Therefore, although the closure may be used with a screw jack, it does not require a screw jack to fracture the frangible section. Additionally, the illustrated horizontal break of the frangible section minimizes hang-ups of a portion of the section, because of the relatively clean and simple rupture of the frangible section as compared with frangible sections requiring a rupture by shear force. The closure is sealed completely around the port with no vent or opening, so that sterility is thus secure.

The closure 20 may be sufficiently long so that when manually pushed sideways, a sufficient mechanical advantage or leverage is provided so that the frangible section will rupture. It has been found that a length at least as great as the diameter of the body portion 21 is satisfactory. Moreover, the diameter of the closure 20 should be sufficiently greater than the diameter of the port tube so that the port tube will not interfere with or support the closure when the body portion thereof is bent sideways.

A preferred method of assembling the closure 20 with the container 10 is illustrated in FIG. 5. As therein illustrated, the closure 20 is assembled over the port or opening with the flange 22 resting on the planar top surface of the neck portion 12. A heat and pressure sealing die 28 is heated above the melting temperature of the plastic materials. The chamfer 26 will aid in centering the sealing die 28.

The sealing die 28 melts the closure flange 22 and continued downward pressure forms a depression 23 and also forms a thin frangible section 24 in the side wall of the depression 23 in the area of the internal diameter of the sealing die. The downward heat and pressure also separates the flange 22 from body portion 21 to force the flange material into an annular bead 19.

Suitable thermoplastic materials include various polyolefins, for example, polyethylene, polypropylene, polyallomer and copolymers of these. The heating die 28 may be heated in the range of 1° F. to 100° F. above the melting point of the plastic; 50° F. above the melting point of the plastic produces satisfactory results.

In a particular embodiment a depression 0.020 inches deep (dimension a, FIG. 3) was formed and a thin, vertical frangible section 24 normal to the planar surface of the neck portion 0.005 inches wide remained. It is preferred that the depression be at least 0.005 inches deep. The frangible section 24 will fracture horizontally in a generally horizontal plane due to tension stress when the closure is removed.

There is illustrated in FIGS. 6-10 an embodiment of a container having a neck portion 30 bondable to the container and provided with multiple ports. As illustrated, the neck portion 30 is formed of molded thermoplastic material and has a first port tube 33 projecting above the neck portion 30. A resilient, pierceable seal 32 is pressure fitted on port tube 33, over a frangible disc-shaped seal 33', to form an injection site. A second port tube 31 is formed with the neck portion 30 and includes a frangible disc-shaped seal 31'.

Figure 7:
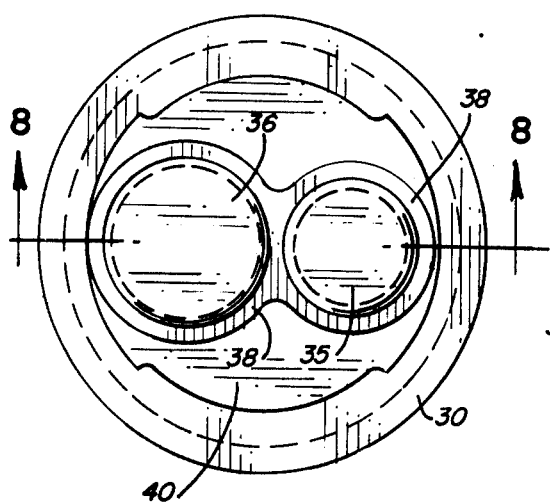
FIG. 7 is a top plan view of the FIG. 6 container closure, prior to heat sealing.
Figure 8:
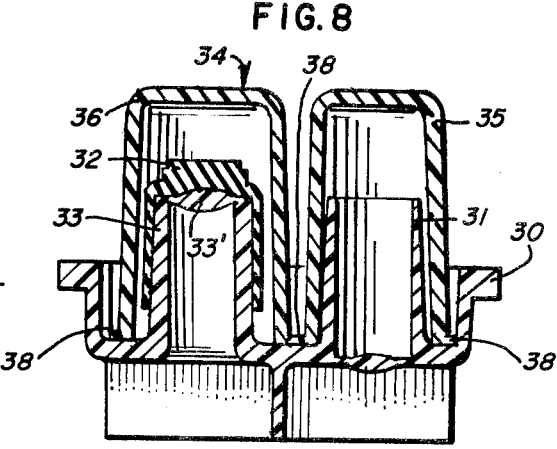
FIG. 8 is a cross-sectional elevation thereof, taken along the plane of the line 8—8 of FIG. 7.
Figure 10:
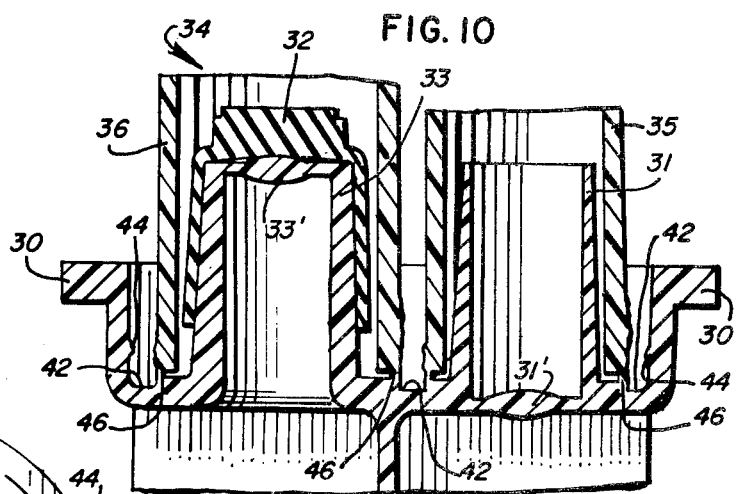
FIG. 10 is an enlarged, fragmentary, cross-sectional elevation thereof, taken along the plane of the line 10—10 of FIG. 9.
Figure 9:
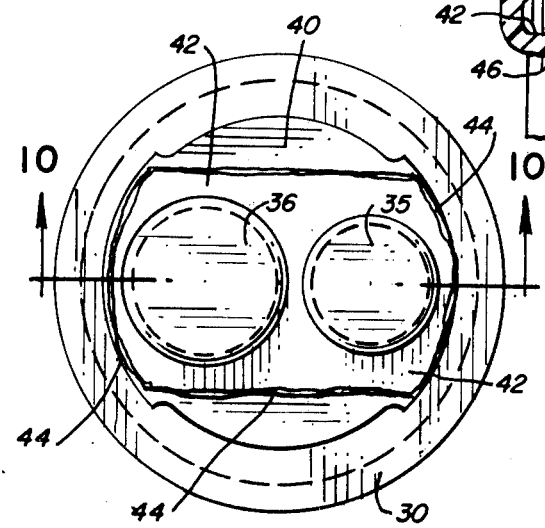
FIG. 9 is a top plan view of the FIG. 6 container closure, subsequent to heat sealing.

A protective closure 34 covers the port tubes 31 and 33. The protective closure includes a projecting first closure cap portion 35 extending over the port tube 31 and a projecting second closure cap portion 36 covering the port 33. As shown in FIGS. 7-8, closure 34 originally included a flange portion 38 extending radially outwardly from and interconnecting closure cap portions 35 and 36.

As with the FIGS. 1-5 embodiment, the closure 34 is assembled over port tubes 31 and 33 with the flange portion 38 resting on the planar top surface 40 of the neck portion 30. A heat and pressure sealing die is heated above the melting temperature of the plastic materials. The sealing die melts the flange portion 38 and continued downward pressure removes flange portion 38 from cap portions 35 and 36, forms a depression 42 completely surrounding cap portions 35 and 36, and forces the flange portion material to be completely displaced and resultingly deposited as an annular bead 44, which annular bead is substantially the outline of the sealing die. As a result of this sealing section, a frangible section 46 is formed normal to the depression 42 with the frangible section forming a vertical side wall of depression 42. Frangible section 46 will rupture under tensile load to provide a horizontal break in the same manner that frangible section 24 of the FIGS. 1-5 embodiment ruptures.

Each of the protective closure cap portions 35, 36 have a length to diameter ratio which provides good leverage at the surface 40 to provide sufficient mechanical advantage permitting manual rupture at surface 40. A length at least as great as the diameter to the closure cap portions 35, 36 has been found to work satisfactorily.

Figure 11:
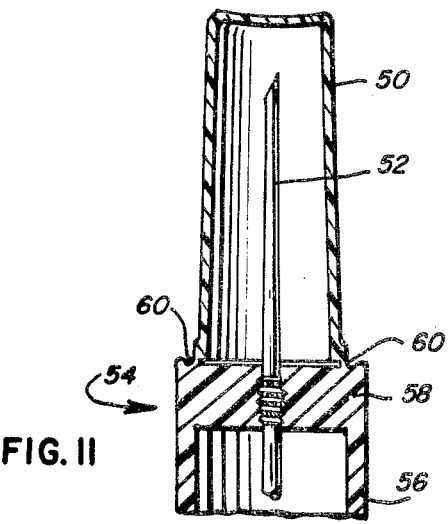
FIG. 11 is a fragmentary cross-sectional elevation of a protective closure used on a hypodermic syringe.

In FIG. 11 a closure cap 50 is shown covering the needle 52 of a hypodermic syringe 54. The body 56 of syringe 54 includes a neck portion 58 on which closure cap 50 is seated, having a frangible section 60, formed in the same manner as the frangible section 24 of the FIGS. 1-5 embodiment is formed.

Advantageously the protective closures may be applied on single port or multiple port containers and are sealed completely around each port, with no vent or opening, thus securing the sterility of the port. The mechanical advantage provides sufficient leverage so that the closure can conveniently be removed by pushing sideways to rupture the frangible section. On a multiple port protector, each of the protective closures may be removed without disturbing the other.

Although a few illustrative embodiments of the invention have been shown and described, various modifications and substitutions may be made by those skilled in the art without departing from the novel spirit and scope of the invention. For example, the closure may be applied to all types of containers, including bottles, syringes, bags, etc.

What is claimed is:

1. An improved method of forming a fracturable seal of the type wherein a thermoplastic cup-shaped closure is sealed to a thermoplastic planar surface, said cup-shaped closure being formed with a radially outwardly extending sealing portion, said method comprising the steps of assembling the closure on the planar surface with said portion seated on said surface; heating a sealing die above the melting temperature of the thermoplastic material of the closure and surface; bringing said sealing die toward and against said portion; and pressing said sealing die into said portion and said surface to depress said surface at least 0.005 inch from its original height by the sealing action of the die and to displace said portion material into a bead outwardly and form a fracturable seal normal to the plane of said surface, whereby said seal will be fractured in a plane substantially parallel to said surface thereafter due to tension stress when the closure is removed from the planar surface.

2. An improved method as set forth in claim 1, wherein said sealing die is heated in the range of 1° F. to 100° F. above the melting point of said thermoplastic.

3. An improved method as set forth in claim 1, wherein said closure includes a chamfer and said method includes the step of centering said sealing die on said chamfer.

* * * * *